April 18, 1950 R. C. LUPLOW 2,504,856
PALM TREE TRIMMER
Filed July 6, 1946 2 Sheets-Sheet 1

INVENTOR.
Ronald C. Luplow
BY Scott R. Norvie
attorney

April 18, 1950 — R. C. LUPLOW — 2,504,856
PALM TREE TRIMMER
Filed July 6, 1946 — 2 Sheets-Sheet 2
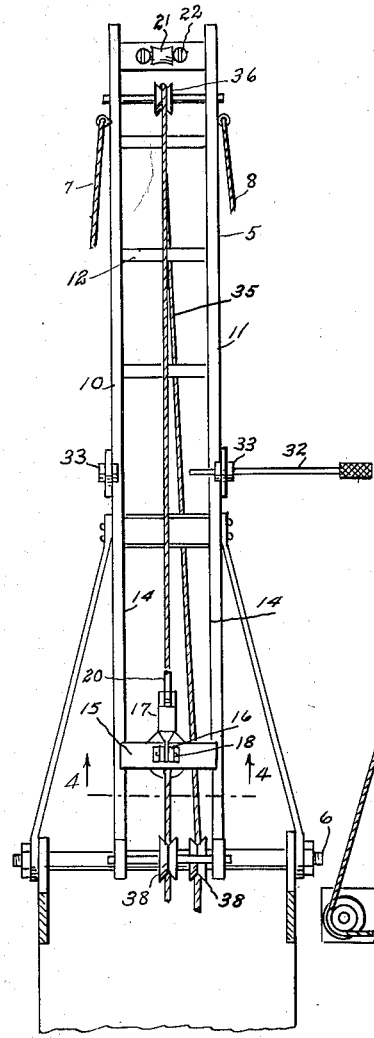
FIG. 2.
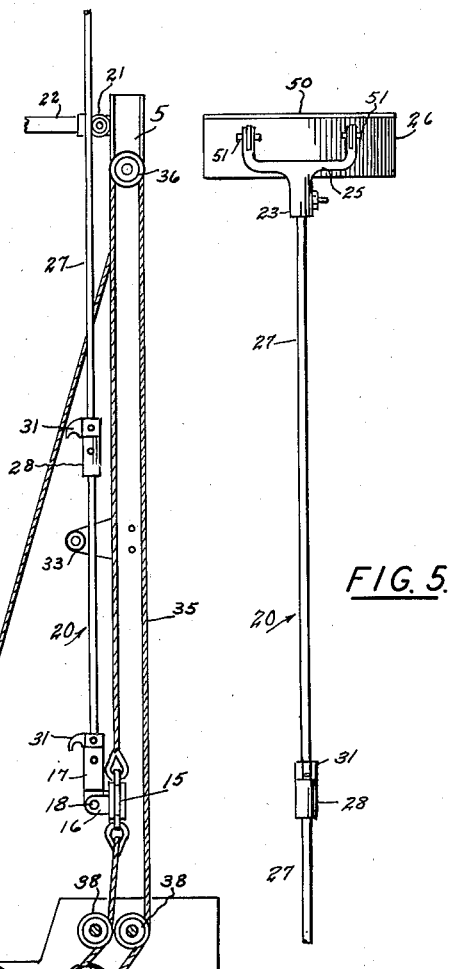
FIG. 3.
FIG. 5.
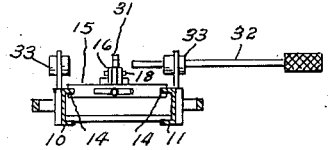
FIG. 4.
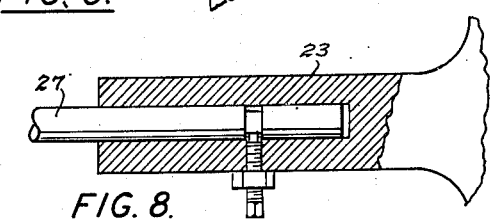
FIG. 8.
INVENTOR.
Ronald C. Luplow
BY Scott L. Norvell
attorney Patented Apr. 18, 1950

2,504,856

UNITED STATES PATENT OFFICE 2,504,856

PALM TREE TRIMMER

Ronald C. Luplow, Phoenix, Ariz.

Application July 6, 1946, Serial No. 681,710

4 Claims. (Cl. 47—1)

This invention pertains to palm tree trimmers.

Heretofore leaves and fronds have been removed from palm trees by hand tools. The laborer must often work at the top of a high ladder and cut the fronds loose from the trunk by saws or hatchets. Aside from being hazardous the results of such hand work are not uniform and in many cases damage to the tree has resulted from careless cutting.

In view of the foregoing, one of the objects of my invention is to provide a machine for cutting leaves from palm tree trunks operative from the ground.

Another object is to provide a machine for cutting leaves from palm trees whereby an arcuate trimming knife can be forced up the side of the trunk to shear leaves and fronds at their bases and so that the outer surface of the trunk will be left smooth.

A further object is to provide a power truck with an angularly adjustable slide frame having an extensible power driven knife carrying rod operative therein, together with means for holding the carrying rod while additional extensions are placed therein.

Other objects will appear hereinafter.

I attain the foregoing objects by means of the machine and mechanism shown in the accompanying drawings, in which—

Figure 6:
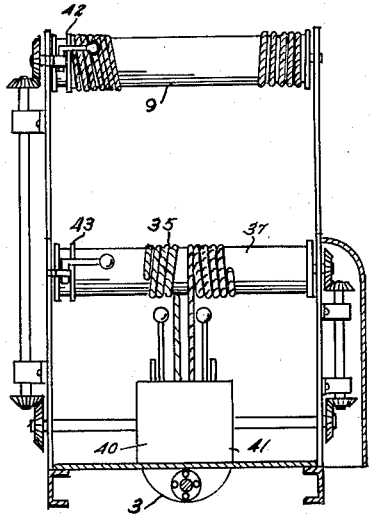
Figure 1:
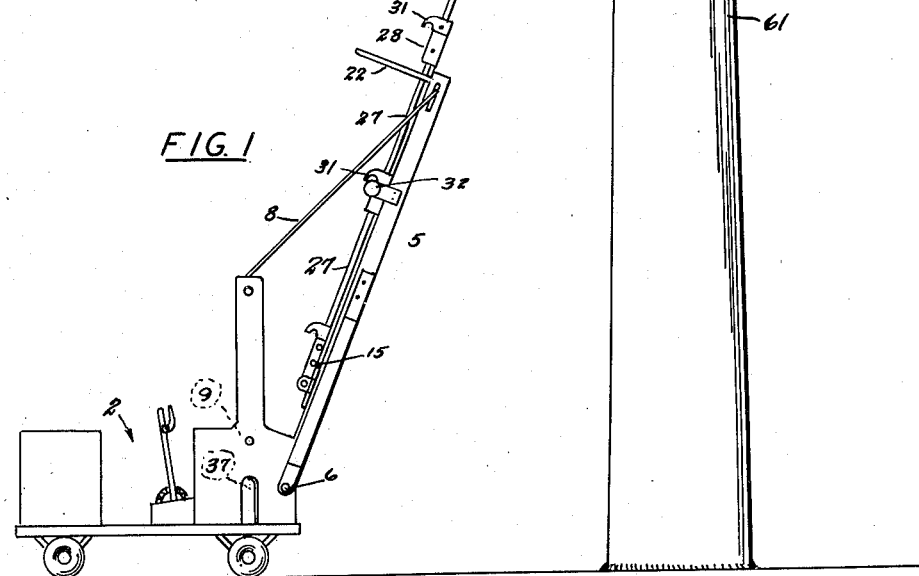
Figure 7:
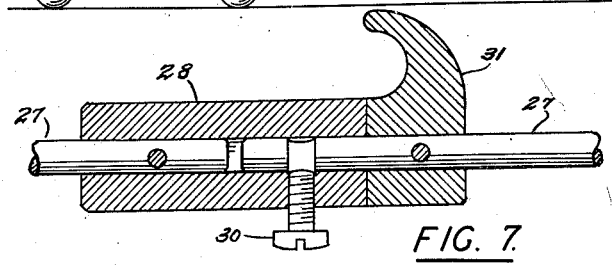

Figure 1 is an elevational view showing the assembled machine in use;

Figure 2, a plan view of the slide frame and portions of the truck supporting it;

Figure 3, a longitudinal sectional elevation of said frame;

Figure 4, a transverse section of said frame taken substantially on line 4—4 of Figure 2;

Figure 5, an elevational view of the front portion of the knife rod, including the knife;

Figure 6, an elevational view of the front end of the truck viewed from the interior and drawn on an enlarged scale;

Figure 7, a section of a rod joint drawn on an enlarged scale, and

Figure 8, a section of the knife swivel drawn on an enlarged scale.

Similar numerals refer to similar parts in the several views.

Mobility for the trimmer is provided by the power driven truck 2, which is of a conventional type and is provided with a power take off 3. The lower end of elevator slide frame 5 is hinged to the truck frame by shaft 6 and normally extends forwardly and upwardly. The outer end is supported by cables 7 and 8 attached to eye bolts and passing over a winch drum 9 on the truck frame.

The frame 5 is composed of two parallel channel bars 10 and 11 suitably tied together and braced by cross members 12. The upper inwardly extending flanges 14 of the channel bars form slide ways for the rod slide 15. On the top of the rod slide lugs 16 support a rod socket 17 by means of a pin bolt 18.

Knife rod 20 is held in socket 17 and extends upward along the top of frame 5 over a concave roller 21 operating between guides 22, and on to the swivel 23 and yoke 25 which is hinged transversely to the frond cutting knife 26. The knife rod is composed of sections 27 joined by socket sleeves 28 which receive the lower end of each section and are secured by set screws 30. The lower end of each section is provided with a hook 31 held on a suitable thimble positioned to engage a transverse stop rod 32 slidably operative in lugs 33 attached to the side channel bars 10 and 11 at about the middle of their length. Movement of the rod slide along the frame 5 is attained by a cable 35 which passes over a pulley 36 at the outer end of the frame and winds up and pays out on a winch drum 37, positioned on the truck frame. Guide sheaves 38 control the position of the cable as it passes from the frame to the drum 37.

Both cable drums 9, and 37 are operated from the truck power take off 3 thru conventional gear and clutch mechanisms 40 and 41. Brakes 42 and 43 are povided to hold the respective drums in position after movement.

The knife 26 is made of an arcuate steel blade sharpened along the top edge 50 and supported by pins 51 which extend transversely thru the arm ends of yoke 25. This means of support allows the knife to adapt its inner face to slide parallel with and upon the surface of the tree trunk. The shank of the yoke is provided with a swivel joint 23 to receive the upper end of the first rod section 27. This enables the knife to swivel on the knife rod so that it may be operated parallel to the axis of the tree with the blade substantially at right angles to said axis even tho the truck is positioned on uneven ground and the knife rod is not exactly alined with the tree.

The device operates on the principle that the knife will shave the leaf fronds 60 from the tree trunk 61 if sufficient power is applied to the knife vertically and toward the tree trunk to cause it to cut into the fronds at their bases, and then follow thru until the frond is completely severed. To do this the truck 2 is driven to a position adjacent a tree as shown in Figure 1. The knife rod with knife in position is then brought to bear on the tree trunk and forced upwardly by operation of the slide 15. As fronds, or frond stumps are cut loose the truck may be driven nearer to the tree base to extend the height of cut, but if this is not sufficient, the slide is moved slightly beyond lugs 33 and the knife rod held by the operation of transverse stop rod 32 which is moved across the frame from the position shown in Figure 2, and engages a hook 31 on the next outer rod section 27. The socket set screw is then loosened, slide 15 lowered and a new rod section inserted into socket 17 and joined to the lower end of the rod held by the stop. The slide is then again operated outwardly and inwardly causing the knife 26 to slide up and down the tree trunk 61. After cutting on one side of the tree the truck is moved to other positions around the tree and the operation repeated until all undesired fronds or frond stumps have been severed and shaved off.

From the foregoing it will be seen that the truck 2 forms a mobile support for the angularly and upwardly extending slide way frame 5 which is pivotally supported so the angle of extension may be varied. The arcuate knife 26 is supported on the extensible knife rod 20 so that it is given an up and down shaving motion by the mechanism on the truck. This may either be from the power take-off 3 from the truck engine, or from an independent power source. The knife is supported on the rod 20 so as to adjust itself to move vertically along the surface of the trunk of the tree. Obviously this device is intended for use only on palm trees of the kind specified. However its exact structure as shown is subjected to wide variation and the component parts may be modified considerably and yet remain within the spirit of the invention. Therefore, I wish to be limited only by the following claims.

I claim:

1. In a palm tree trimmer including a power driven truck, a slide way pivotally mounted on the front end thereof, and adjustably secured at an upward and outward angle, a knife rod slide operable therealong, power driven means for operating said knife rod slide along said slide way, a hinged socket carried on said slide adapted to carry a knife rod, a knife rod having joints including stop hooks, a transverse stop rod operable on said slide way to engage joint hooks of said rod, the combination therewith of an arcuate trimming knife pivotally supported by transverse pins at the outer end of said knife rod.

2. In a palm tree trimmer comprising, a power driven truck having a power take-off, an outwardly and upwardly extending slide way frame mounted on said truck by a transverse shaft, having a rod roller and guide at its outer end and an intermediately positioned transversely operative stop rod, an angle adjusting drum mounted on said truck operative from said power take-off and having cables extending to the outer end of said slideway frame; a rod slide operative along said slideway frame having a hinged socket to receive the lower end of a knife rod; a slide operating drum on said truck operative from said power take-off; a cable operative thereon to pay out and take in a loop extending along said slideway frame and being attached to said rod slide; a jointed knife supporting rod operative by said slide along said slide way, said rod joints having hooks cooperative with said stop rod to hold the outer end of said knife rod; the combination therewith of an arcuate trimming knife mounted on transverse hinge joints at the outer end of said knife rod and adapted to axial swivel movement thereon.

3. In a palm tree trimmer, as herein disclosed, a trimming knife formed as a rectangular piece of steel having an arcuate plan, a cutting edge along the top edge and supporting lugs on each side of the convex surface at about the middle of its height adapted to receive transverse pins, in combination with a knife support including a fork having the tines slotted to engage said lugs and a shank adapted to receive a knife rod and be retained thereon in rotatable relation thereto.

4. In a palm tree trimmer, as herein disclosed, a trimming knife formed from a rectangular piece of steel having an arcuate plan, a cutting edge along the top edge and supporting lugs on each side of the convex surface at about the middle of its height adapted to receive transverse pins, in combination with a knife support including a fork having the tines slotted to engage said lugs and a shank adapted to receive a knife rod and be retained thereon in rotatable relation thereto, a jointed knife driving and supporting rod, and power driven mechanism for operating said rod angularly to the tree.

RONALD C. LUPLOW.

REFERENCES CITED

The following references are of record in the file of this patent:

UNITED STATES PATENTS

| Number | Name | Date |
|---|---|---|
| 1,318,324 | Keon | Oct. 7, 1919 |
| 1,558,735 | McArthur | Oct. 27, 1925 |
| 1,602,357 | Georgelis | Oct. 5, 1926 |
| 2,482,392 | Whitaker | Sept. 20, 1949 |

FOREIGN PATENTS

| Number | Country | Date |
|---|---|---|
| 722,254 | France | Dec. 28, 1931 |
| 96,272 | Sweden | July 18, 1939 |